(12) United States Patent
Rossotto (10) Patent No.: US 10,106,268 B2
(45) Date of Patent: Oct. 23, 2018

(54) METHOD OF REGULATING A THREE-ENGINED POWER PLANT FOR A ROTARY WING AIRCRAFT

(71) Applicant: AIRBUS HELICOPTERS, Marignane (FR)

(72) Inventor: Regis Rossotto, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 414 days.

(21) Appl. No.: 15/175,269

(22) Filed: Jun. 7, 2016

(65) Prior Publication Data

US 2017/0066541 A1 Mar. 9, 2017

(30) Foreign Application Priority Data

Jun. 23, 2015 (FR) ...................... 15 01300

(51) Int. Cl.
*B64D 35/08* (2006.01)
*B64D 31/06* (2006.01)
(Continued)

(52) U.S. Cl.
CPC .............. *B64D 31/06* (2013.01); *B64C 27/06* (2013.01); *B64C 27/12* (2013.01); *B64D 35/08* (2013.01);
(Continued)

(58) Field of Classification Search
CPC ........ B64D 31/06; B64D 35/08; B64D 27/12; B64C 27/04; B64C 27/12; B64C 27/042;
(Continued)

(56) References Cited

U.S. PATENT DOCUMENTS

| 3,963,372 A | 6/1976 | McLain et al. |
| 4,479,619 A | 10/1984 | Saunders et al. |

(Continued)

FOREIGN PATENT DOCUMENTS

| CN | 101400569 A | 4/2009 |
| CN | 101400569 A | 4/2009 |

(Continued)

OTHER PUBLICATIONS

French Search Report for French Application No. FR 1501300, Completed by the French Patent Office dated Mar. 14, 2016, 9 Pages.

(Continued)

*Primary Examiner* — McDieunel Marc
(74) *Attorney, Agent, or Firm* — Brooks Kushman P.C.

(57) ABSTRACT

A power plant comprising two engine groups and a main power transmission gearbox. Each engine group drives the main gearbox mechanically in order to rotate a main rotor of an aircraft at a frequency of rotation NR. A first engine group comprising two main engines is regulated on a first setpoint NR* for the frequency of rotation NR, while a second engine group comprising a secondary engine is regulated on a second setpoint $W_2^*$ for power. The second setpoint $W_2^*$ for power is determined so that each secondary engine operates only when a flight power $W_{vol}$ necessary for the flight of the aircraft is greater than the sum of the main maximum powers $W_{Max1}$ from each main engine.

15 Claims, 2 Drawing Sheets

(51) Int. Cl.
*B64C 27/12* (2006.01)
*F02C 9/42* (2006.01)
*F02C 6/20* (2006.01)
*B64C 27/06* (2006.01)

(52) U.S. Cl.
CPC ............... *F02C 6/206* (2013.01); *F02C 9/42* (2013.01); *F05D 2220/329* (2013.01); *Y02T 50/671* (2013.01)

(58) Field of Classification Search
CPC .......... F02C 66/02; F02C 66/206; F02C 9/42; F05D 2220/329; F05D 2270/023; F05D 2270/052; F05D 2270/13
See application file for complete search history.

(56) References Cited

U.S. PATENT DOCUMENTS

| | | | |
|---|---|---|---|
| 9,193,453 | B2 | 11/2015 | Vallart et al. |
| 9,353,642 | B2 | 5/2016 | Certain |
| 2008/0294305 | A1* | 11/2008 | Roesch ................ B64C 27/22 701/3 |
| 2009/0018714 | A1 | 1/2009 | Lemaignan et al. |
| 2009/0321554 | A1* | 12/2009 | Roesch ................ B64C 27/26 244/6 |
| 2010/0224720 | A1* | 9/2010 | Roesch ................ B64C 27/26 244/12.3 |
| 2010/0308154 | A1* | 12/2010 | Gemmati ............. B64C 27/22 244/6 |
| 2011/0024551 | A1* | 2/2011 | Biest .................... B64C 13/46 244/6 |
| 2013/0219905 | A1 | 8/2013 | Marconi et al. |
| 2014/0145028 | A1 | 5/2014 | Gomez |
| 2015/0028153 | A1 | 1/2015 | Rossotto et al. |
| 2015/0125258 | A1 | 5/2015 | Certain |
| 2016/0214733 | A1* | 7/2016 | Vallart ................. B64C 27/57 |
| 2016/0375994 | A1* | 12/2016 | Rossotto ............. B64C 27/12 701/3 |
| 2016/0376017 | A1* | 12/2016 | Rossotto ............. F02C 6/206 701/99 |
| 2017/0010148 | A1* | 1/2017 | Germanetti ......... G01G 19/07 |
| 2017/0240290 | A1* | 8/2017 | Dumur ................ B64D 31/14 |
| 2017/0369181 | A1* | 12/2017 | Certain ............... B64C 27/006 |

FOREIGN PATENT DOCUMENTS

| | | |
|---|---|---|
| CN | 103921934 A | 7/2014 |
| CN | 103921934 A | 7/2014 |
| CN | 103921938 A | 7/2014 |
| CN | 103921938 A | 7/2014 |
| EP | 2735508 | 5/2014 |
| FR | 2998542 | 5/2014 |
| FR | 2998543 | 5/2014 |
| FR | 3000466 | 7/2014 |
| FR | 3008957 | 1/2015 |
| WO | 2012059671 | 5/2012 |

OTHER PUBLICATIONS $1^{St}$ Chinese Office Action, English Translation.
First Chinese Office Action for Application No. 201610459182.8, dated Jan. 3, 2018, 8 pages.

* cited by examiner

METHOD OF REGULATING A THREE-ENGINED POWER PLANT FOR A ROTARY WING AIRCRAFT

CROSS REFERENCE TO RELATED APPLICATION

This application claims priority to French patent application No. FR 15 01300 filed on Jun. 23, 2015, the disclosure of which is incorporated in its entirety by reference herein.

BACKGROUND OF THE INVENTION (1) Field of the Invention

The present invention lies in the field of powering rotary wing aircraft having a plurality of engines, and more particularly to the field of regulating such a power plant.

The present invention provides a method of regulating a power plant for a rotary wing aircraft and also the power plant and a rotary wing aircraft provided with such a power plant. The invention is particularly intended for regulating a power plant having three engines.

(2) Description of Related Art

A power plant for a rotary wing aircraft generally comprises one or two engines and a main power transmission gearbox. Each engine drives the main gearbox mechanically in order to rotate at least one main outlet shaft of the main gearbox. The main outlet shaft is constrained to rotate with at least one main rotor of the rotary wing aircraft in order to provide the aircraft with lift and possibly also with propulsion.

The main gearbox generally also has secondary outlet shafts, e.g. for driving rotation of a tail rotor or of one or two propulsion propellers via an auxiliary gearbox, and also rotation of an electricity generator and/or hydraulic systems. The respective frequencies of rotation of the secondary outlet shafts are generally different from the frequency of rotation of the main outlet shaft.

It should be observed that the term "engine" is used to mean a driver unit driving said main gearbox mechanically, and consequently contributing to providing the rotary wing aircraft with lift and/or propulsion. By way of example, such engines may be turboshaft engines.

It is now common practice to use two-engined power plants on rotary wing aircraft, each engine being controlled by a dedicated computer. Such engines are generally identical turboshaft engines operating in compliance with regulation rules.

For example, proportional regulation can be used to enable a system to be regulated in proportion to a difference between a current value of the system that is to be regulated and a setpoint value. Such regulation is generally effective. However, proportional regulation never reaches the setpoint value, and there always exists a difference between the current value and the setpoint. Nevertheless, it is possible to approach the setpoint by reducing the difference, but the system then often becomes unstable.

Such proportional regulation, applied to a two-engined power plant of an aircraft enables the two engines of the power plant to be balanced naturally, both in terms of frequency of rotation and of power delivered. Nevertheless, such proportional regulation does not make it possible for the frequency of rotation of the main rotor of the aircraft to be stabilized accurately and effectively.

It is then possible to add a calculation for anticipating the power that the power plant is to deliver in order to improve the effectiveness of such proportional regulation of the frequency of rotation of the main rotor of the aircraft. Such power anticipation calculation is described in particular in Document FR 3 000 466 in the particular context of the main rotor having a frequency of rotation that is variable.

In order to improve proportional regulation, it is possible to introduce an additional correction that enables errors in tracking the setpoint to be eliminated. This correction is proportional to integrating the difference between the current value and the setpoint over time, i.e. it is proportional to the sum of all of the differences as measured continuously. This is then referred to as proportional integral regulation.

There also exists proportional integral derivative regulation which includes an additional correction that is proportional to the derivative of the difference. This correction makes it possible to take account also of variations in the difference, both in direction and in amplitude.

Proportional integral regulation is frequently used on twin-engined aircraft, thus making it possible to control accurately the frequency of rotation of the main rotor and also the performance of the aircraft. Operation is then balanced between the two engines of the power plant, thus making it possible in particular to ensure that wear is symmetrical on these engines and also on the mechanical inlet connections to the main gearbox.

However, such proportional integral regulation requires complex connections between the computers of the two engines in order to ensure that each engine delivers equivalent power. In particular, such proportional integral regulation requires the use of a balancing loop between the two computers.

Furthermore, the computers must be of relatively high performance in order to make such regulation possible. For example, these computers may be of the full authority digital engine control (FADEC) type. These computers are also often two-channel computers, i.e. the connections between the computers and also between the computers and the engines are duplicated in order to make those connections safe, and consequently make safe the operation of the power plant.

Furthermore, the size of rotary wing aircraft is tending to increase, so the need for power from the power plant is also increasing. Consequently, the power plants of such aircraft are being provided with at least three engines in order to be capable of delivering sufficient power.

Three-engined rotary wing aircraft are nowadays mainly fitted with three engines that are identical, thus making it possible in particular to ensure that the power plant responds reactively in the event of the failure of one engine, and also simplifying the installation and the integration of the engine.

Engines are said to be "identical" when they have identical drive characteristics for a rotary member.

Conversely, engines are said to be "unequal" when they have distinct drive characteristics, i.e. engines that generate different maximum powers and/or unequal maximum torque and/or different maximum frequencies of rotation of an outlet shaft. Thus, two unequal engines may correspond respectively to an engine driving an outlet shaft at several tens of thousands of revolutions per minute and to an engine driving an outlet shaft at less than ten thousand revolutions per minute, for example.

For a power plant having three identical engines, the three identical engines are generally regulated identically, with each engine delivering equivalent power.

Nevertheless, the regulation applied to the three identical engines can be different, e.g. two engines may be considered as main engines while the third engine is considered as a secondary engine. The secondary engine then delivers power that is additional to that delivered by the two main engines, depending on the loads on and the needs of the power plant. The power delivered by the secondary engine is then generally different from the power delivered by each of the main engines.

It is also possible to use unequal engines in a three-engined power plant, e.g. for the purpose of satisfying safety requirements or indeed of mitigating the lack of power from engines that are available on the market. For such a three-engined power plant, the regulation of the three engines can turn out to be even more complex, in particular in terms of distributing power among the engines and regulating the frequency of rotation of the main rotor.

In both situations, i.e. whether the engines of the power plant are identical or unequal, the distribution of power between the main engines and each secondary engine of the power plant can be problematic and difficult to optimize.

In particular Documents FR 2 998 542, FR 2 998 543, and FR 3 008 957 are known, which describe a power plant for a rotary wing aircraft having two identical main engines and a secondary engine.

Document FR 2 998 542 describes a secondary engine delivering constant secondary power, the secondary engine being put into operation under certain particular flight conditions such as landing, takeoff, or hovering.

In contrast, Document FR 2 998 543 describes a secondary engine delivering secondary power that is proportional to the main power delivered by each main engine with a coefficient of proportionality that is less than or equal to 0.5.

According to Document FR 3 008 957, the main engines are regulated on a first setpoint for the frequency of rotation of the main rotor of the aircraft, while the secondary engine is regulated on a second setpoint for the power of the secondary engine. Furthermore, the main engines are also regulated on a third setpoint for anticipated power so that the main and secondary engines acting jointly can deliver the power needed at the main rotor for the flight of the aircraft.

The dimensioning of the power plant of an aircraft is thus complex, independently of the selected configuration.

In the technological background, Document U.S. Pat. No. 4,479,619 is known, which proposes a power transmission system for three-engined helicopters. That solution also proposes an alternative to declutching of one of the three engines. The Super-Frelon helicopter of the Applicant also possesses three identical turboshaft engines.

Document U.S. Pat. No. 3,963,372 proposes a solution for managing power and controlling engines in three-engined helicopters.

In order to mitigate the problem of engines that are designed so as to be overdimensioned, a power plant having engines with unequal maximum powers, for two-engined aircraft, have already been envisaged in the past. This applies to Document WO 2012/059671, which proposes two engines having unequal maximum powers.

BRIEF SUMMARY OF THE INVENTION

An object of the present invention is thus to optimize regulation of a power plant in a novel configuration. In particular, the present invention makes it possible, continuously and as a function of the power need of the aircraft, to manage the distribution of power among the main engines and each secondary engine of the power plant depending on the loads on the main engines.

The present invention thus provides a method of regulating a power plant having at least three engines for a rotary wing aircraft.

This method of regulating a power plant for an aircraft is for a power plant that has a first engine group, a second engine group, and a main power transmission gearbox, the two engine groups mechanically driving the main gearbox so as to rotate a main outlet shaft of the main gearbox. The main outlet shaft is constrained to rotate with a main rotor of the aircraft, which main rotor has a frequency of rotation NR. A first engine group comprises at least two main engines, and a second engine group comprises at least one secondary engine.

In addition, each main engine and each secondary engine, generally turboshaft engines each having a gas generator and a free turbine, possesses a maximum power that is different depending on the stage of flight and on the operating conditions of the engines. Thus, each main engine delivers a main maximum power $W_{Max1}$ and each secondary engine delivers a secondary maximum power $W_{Max2}$. The values of these main and secondary maximum powers $W_{Max1}$ and $W_{Max2}$ are provided by the manufacturers of the engines, generally in the form of plots as a function of the pressure and the temperature of the air outside the aircraft.

By way of example, a maximum continuous power (MCP) is available continuously during the flight of the aircraft and a maximum takeoff power (TOP) of greater value is available for a limited length of time during a stage of the aircraft taking off.

Furthermore, in order to compensate for a failure of an engine, each engine that remains in operation is caused to operate in a special mode known as one engine inoperative (OEI). This special mode enables each engine to develop emergency mechanical powers that are greater than the maximum continuous mechanical power MCP, but with constraints on operating time.

This method of regulating a power plant of the invention comprises the following plurality of steps:

determining a first setpoint NR* for the frequency of rotation NR of the main rotor;

regulating the operation of each main engine on the first setpoint NR* for the frequency of rotation NR of the main rotor of the aircraft;

determining a flight power $W_{vol}$ needed for the flight of the aircraft, the flight power $W_{vol}$ being delivered by the power plant;

determining a second setpoint $W_2$* for the power to be delivered by the second engine group so that each secondary engine operates only when the flight power $W_{vol}$ is greater than the sum of said main maximum powers $W_{Max1}$ of each main engine; and regulating the operation of each secondary engine on the second setpoint $W_2$* for power.

In the context of rotary wing aircraft, the first setpoint NR* for the frequency of rotation NR of the main rotor of the aircraft is traditionally a constant value. Consequently, this constant first setpoint NR* is determined while the aircraft is under development, after study and testing so as to take numerous criteria into account, such as on-board weight, travel speed of the aircraft, aerodynamics, or indeed type of mission.

Nevertheless, this first setpoint NR* for the frequency of rotation NR of the main rotor of the aircraft may also be variable, generally over a predetermined range, e.g. of the order of 15% to 20% of a nominal frequency of rotation for the main rotor. This variation in the first setpoint NR* makes it possible, for example, to reduce the noise from the aircraft or indeed to improve its aerodynamic performance, in particular at high forward speeds.

This variable first setpoint NR* is then determined continuously during the flight of the aircraft. This variable first setpoint NR* may be determined by a computer on board the aircraft, such as an automatic flight control system "(AFCS)". In particular, the variable first setpoint NR* may be determined as a function, among others, of actions on flight controls, of flight characteristics of the aircraft, and of the stage of flight of the aircraft.

The operation of the first engine group is then regulated so as to control the frequency of rotation NR of the main rotor of the aircraft. This frequency of rotation NR is then substantially equal to the first setpoint NR*, but may nevertheless vary a little around this first setpoint NR* when regulation is taking place in dynamic stages.

By way of example, the operation of each main engine of the first engine group is regulated using a proportional integral regulation loop, possibly via a first regulator device. The first regulator device serves to regulate the frequency of rotation of the free turbine of each main engine, each main engine preferably being a turboshaft engine managed by a FADEC type main computer. The free turbine of each main engine drives the main gearbox and enables at least the main outlet shaft to be rotated, and consequently enables the main rotor of the rotary wing aircraft to be rotated at the frequency of rotation NR.

Thereafter, a second setpoint $W_2^*$ is determined for the power to be delivered by the second engine group, so that the second engine group operates only when the flight power $W_{vol}$ is greater than the maximum power that can be delivered by the first engine group.

The flight power $W_{vol}$ of the aircraft is made up mainly of the power necessary for the flight of the aircraft in order to perform the maneuvers and the movements requested by the pilot. This power necessary for flight is shared between the main rotor and the anti-torque rotor.

It should be observed that this flight power $W_{vol}$ of the aircraft also includes accessory power for powering equipment of the aircraft. By way of example, the accessory power is used for air conditioning the aircraft cabin, for powering the electrical equipment on board the aircraft such as the avionics and alternators, or indeed for powering hydraulic equipment of the aircraft. This accessory power, which is made up mainly of electrical power and hydraulic power, can be determined in known manner.

Finally, the operation of the second engine group is regulated to deliver a second power $W_2$. Consequently, this second power $W_2$ is substantially equal to the second setpoint $W_2^*$, but may nevertheless vary a little around this second setpoint $W_2^*$ when regulation is taking place during dynamic stages.

By way of example, the operation of each secondary engine of the second engine group is regulated using a proportional regulation loop or indeed a proportional integral regulation loop, possibly by means of a second regulator device. The power delivered by each secondary engine is thus adjusted without increasing the work load on the pilot compared with piloting a two-engined aircraft, from the point of view of the piloting necessary for maintaining the performance of the aircraft. This second regulator device serves to control the torque from each secondary engine so that the second engine group delivers the second power $W_2$, even though the speed of rotation of each secondary engine is imposed by each main engine being regulated on the first setpoint NR*.

Furthermore, the second regulator device includes as many secondary computers as there are secondary engines, each secondary computer being connected to a single secondary engine, the secondary computers being connected to one another in order to enable the secondary engines to be regulated. By way of example, each computer is of the FADEC type.

In this method of regulating a power plant, each secondary engine operates only when said flight power $W_{vol}$ is greater than the sum of the main maximum powers $W_{Max1}$ from each main engine. Thus, each secondary engine is used only when the first engine group cannot, on its own, deliver the flight power $W_{vol}$ needed for the flight of the aircraft while maintaining its performance.

Several situations then need to be taken into account depending on a comparison between the flight power $W_{vol}$ and the maximum power that can be delivered by the first engine group.

Firstly, in a first situation, so long as a first sum of the main maximum powers $W_{Max1}$ from each main engine is greater than or equal to the flight power $W_{vol}$, the second setpoint $W_2^*$ is zero. As a result, the first engine group acts on its own and without assistance from the second engine group to deliver this flight power $W_{vol}$ necessary for the flight of the aircraft.

This first situation corresponds to stages of flight that consume little power. By way of example they may be stages of descending flight or of level flight at low speeds and/or with little on-board weight.

In contrast, when the first sum of the main maximum powers $W_{Max1}$ from each main engine is less than the flight power $W_{vol}$ the second engine group needs to deliver secondary power in order to enable the power plant to deliver the flight power $W_{vol}$. The second setpoint $W_2^*$ is then non-zero. Nevertheless, two other situations then need to be distinguished and they are referred to below as the second situation and the third situation.

In a second situation, when the difference between the flight power $W_{vol}$ and the first sum of the main maximum powers $W_{Max1}$ from each main engine is positive and less than a second sum of the secondary maximum powers $W_{Max2}$ from each secondary engine, the second setpoint $W_2^*$ is equal to this difference between the flight power $W_{vol}$ and the first sum of the main maximum powers $W_{Max1}$.

Each secondary engine is then in use, and possibly even heavily loaded, in order to deliver the additional power that is necessary in order to guarantee the performance of the aircraft. This second situation corresponds to stages of flight of the aircraft that consume a large amount of power. For example, they may be stages of takeoff, landing, hovering, climbing flight, or indeed level flight at high speeds and/or with heavy on-board weight.

In a third situation, when this difference between the flight power $W_{vol}$ and the first sum of the main maximum powers $W_{Max1}$ is greater than the second sum of secondary maximum powers $W_{Max2}$ the second setpoint $W_2^*$ is equal to the second sum of secondary maximum powers $W_{Max2}$.

Each secondary engine is then loaded to the maximum in order to deliver additional power equal to the secondary maximum power $W_{Max2}$. The main engines also deliver their main maximum powers $W_{Max1}$. This third situation is nevertheless exceptional, with the power plant delivering the maximum available power for normal operation of the main and secondary engines. The pilot then has no additional power margin for normal operation of the engines. This third situation corresponds for example to a sudden maneuver for avoiding an obstacle or to a failure of an engine.

These three situations can thus be summarized using the following formula:

$$W_2^* = \mathrm{MIN}\{\Sigma W_{Max2}, \mathrm{MAX}[0, W_{vol} - \Sigma W_{Max1}]\}$$

Advantageously, each secondary engine is not used continuously, but only when needed, during stages of flight that consume a large amount of power, so the wear of each secondary engine is reduced, thus making it possible both to reduce its maintenance costs and also the time the aircraft is not available.

Preferably, the first engine group comprises two identical main engines, while the second engine group comprises a single secondary engine that is different from the main engine. The secondary engine may for example be lighter in weight and smaller in size than the main engines and may deliver maximum power that is less than that of the main engines.

Furthermore, the first engine group and the second engine group deliver output power Ws jointly. This output power Ws is equal to the sum of the second power $W_2$ delivered by the second engine group plus a first power $W_1$ provided by the first engine group, such that:

$$Ws = W_1 + W_2$$

In the method of the regulating a power plant, a flight anticipation power Ws* is determined that corresponds to a power that might potentially be necessary for the flight of the aircraft and that would need to be delivered by the power plant, and would thus need to be delivered jointly by the first and second engine groups. This flight anticipation power Ws* is generally estimated as a function of the position of the collective pitch control for the blades of the main rotor of the aircraft, of the frequency of rotation NR of the main rotor, and of the speed of advance of the aircraft.

Thereafter, a third setpoint $W_1^*$ is determined for the power to be delivered by the first engine group, such that:

$$Ws^* = W_1^* + W_2^*$$

Finally, this third setpoint $W_1^*$ for power can be used so that the first engine group and the second engine group anticipate the aircraft's need for power and act jointly to deliver the flight anticipation power Ws*.

The flight anticipation power Ws* may be determined by anticipation means taking account by anticipation of torque and/or power requirements at the main rotor of the aircraft.

This flight anticipation power Ws* may also be determined depending on the performance needs of the aircraft, in particular on the basis of information about the flight status and the flight situations of the aircraft and also as a function of flight controls operated by a pilot of the aircraft. For example, the anticipation means take account of the first setpoint NR* and also of the acceleration or the deceleration of the main rotor.

The anticipation means may be incorporated in calculation means present in the aircraft or indeed directly in the avionics installation of the aircraft.

In addition, in the particular situation of a given stage of flight of the aircraft and since the frequency of rotation NR of the main rotor is regulated by the first engine group, the flight anticipation power Ws* may be constant. The second regulator device then serves to adjust the distribution of this necessary flight anticipation power Ws* between each of the engine groups.

The second engine group is thus controlled solely in power, depending on the second setpoint $W_2^*$, while the first engine group is regulated so as to give priority to controlling the frequency of rotation NR of the main rotor of the aircraft. The power delivered by each engine group can thus advantageously be optimized as a function of needs and without degrading the performance of the power plant, and in particular while complying with the first setpoint NR*. The distribution of flight anticipation power Ws* between the two engine groups, i.e. between the second and third setpoints $W_2^*$ and $W_1^*$ for power, can then be performed by the calculation means depending on various operating criteria of the power plant.

Furthermore, it should be observed that the flight power $W_{vol}$ varies with flight conditions of the aircraft, and in particular with atmospheric conditions, with characteristics of the aircraft, and with the stage of flight of the aircraft.

In order to detect these stages of flight, it is possible to use a selection algorithm for determining the stage of flight of the aircraft automatically.

By way of example, this algorithm uses values for the horizontal speed Vh and the vertical speed Vz of the aircraft as determined by speed sensors present in the aircraft.

This algorithm can also use data coming from the flight controls of the aircraft. Specifically, particular combinations of flight control positions correspond to particular stages of flight of the aircraft that are distinct. For example, it is known to make use of the positions of the collective pitch lever (for controlling the collective pitch of the blades of the main rotor) and of the pedals (for controlling the collective pitch of the blades of the anti-torque rotor) in order to determine the stage of flight of the aircraft.

Finally, this algorithm may make use of attitude and acceleration data of the aircraft along each of its axes. This data may be supplied by way of example by an inertial unit or by an attitude and heading reference system (AHRS).

For each stage of flight of the aircraft, specific performance plots make it possible to determine the power necessary for the flight of the aircraft, the power plant needing to deliver the flight power $W_{vol}$ equal to the sum of the power necessary for the flight plus the accessory power in order to perform this stage of flight. Depending on the stage of flight, these performance plots are constituted by curves as a function of atmospheric conditions, in particular the pressure and the temperature of the air outside the aircraft, and/or as a function of the total weight of the aircraft.

These performance plots generally take account of the characteristics of the aircraft, such as aerodynamic characteristics. For example, the type of air inlet and the type of exhaust associated with each engine has an influence on the operation of the engine as a result of the head losses generated thereby, and may be taken into account in the performance plots. Likewise, when a filter is used on each air inlet, thereby degrading the performance of an engine, it is necessary to use special performance plots that take the filter into account.

Furthermore, the speed of rotation and the efficiency of the main rotor of the aircraft having an influence on the necessary power can be used for adjusting the power necessary for flight by means of performance plots that take account in particular of the frequency of rotation NR of the main rotor.

In the event of a failure of at least one main engine, it is possible to continue regulating the operation of each secondary engine on the second setpoint $W_2^*$ for power. Thus, each secondary engine operates only when the flight power $W_{vol}$ is greater than the sum of the main maximum powers $W_{Max1}$ delivered by each operational main engine.

Furthermore, even when the second setpoint $W_2^*$ is zero, each secondary engine is nevertheless still "running", and operating at a low speed of rotation in order to be capable of being activated quickly in the event of a failure of a main engine.

Nevertheless, in the event of a failure of at least one main engine, each secondary engine may also be regulated differently in order to distribute the power of the power plant differently between each main engine that has not failed and each secondary engine.

For example, it is possible to use each secondary engine delivering its secondary maximum power $W_{Max2}$. Thus, the second engine group delivers a maximum second power $W_2$ in order to limit the first power $W_1$ delivered by the first engine group. This makes it possible to reduce or even to avoid the use of OEI modes of operation for each main engine that is still operational.

It is also possible to regulate the operation of each secondary engine on the first setpoint NR* for the frequency of rotation NR of the main rotor, so as to guarantee that this first setpoint NR* is complied with. This regulation may be performed in proportional mode or indeed in proportional integral mode.

The present invention also provides a power plant for an aircraft and comprising a first engine group, a second engine group, and a main power transmission gearbox. The two engine groups drive the main gearbox mechanically in order to rotate at least one main outlet shaft of the main gearbox. The main outlet shaft is constrained to rotate with a main rotor of the aircraft at a frequency of rotation NR.

A first engine group comprises at least two main engines and a first regulator device. The first regulator device is configured to regulate the operation of each main engine on a first setpoint NR* for the frequency of rotation NR of the main rotor of the aircraft.

A second engine group has at least one secondary engine and a second regulator device. The second regulator device is configured to regulate the power delivered by each secondary engine on a second setpoint $W_2^*$ for the power to be delivered by the second engine group.

The power plant needs to deliver a flight power $W_{vol}$ necessary for the flight of the aircraft. In addition, each main engine is capable of delivering a main maximum power $W_{Max1}$ and each secondary engine is capable of delivering a secondary maximum power $W_{Max2}$.

Calculation means are configured to determine the second setpoint $W_2^*$ so that each secondary engine operates only when the first engine group cannot, on its own, deliver the flight power $W_{vol}$ necessary for the flight of the aircraft, as described above. These calculation means may be situated in the power plant or in the aircraft.

The power plant may also include anticipation means configured to determine the flight anticipation power Ws* necessary for the flight of the aircraft and that needs to be delivered jointly by the first and second engine groups. The third setpoint $W_1^*$ for the power to be delivered by the first engine group is thus determined so that:

$$Ws^* = W_1^* + W_2^*$$

Finally, this third setpoint $W_1^*$ for power can then be used so that the first engine group and the second engine group anticipate the power need of the aircraft and act jointly to deliver the flight anticipation power Ws*.

The first engine group preferably has two identical main engines and the second engine group has a single secondary engine different from the main engines.

In the event of a failure of at least one main engine, the second regulator device enables the operation of each secondary engine to be regulated on the first setpoint NR* for the frequency of rotation NR of the main rotor in proportional mode or indeed in proportional integral mode. The second regulator device may also regulate the operation of each secondary engine on the second setpoint $W_2^*$ for power as determined above or indeed by delivering the secondary maximum power $W_{Max2}$ available from each secondary engine.

The present invention also provides a rotary wing aircraft having at least one main rotor, a power plant as described above, and an avionics installation, the power plant driving the main rotor in rotation. The calculation means may be situated in the avionics installation of the aircraft.

BRIEF DESCRIPTION OF THE SEVERAL VIEWS OF THE DRAWINGS

The invention and its advantages appear in greater detail from the context of the following description of implementations given by way of illustration and described with reference to the accompanying figures, in which.

Elements present in more than one of the figures are given the same references in each of them.

DETAILED DESCRIPTION OF THE INVENTION

Figure 1:
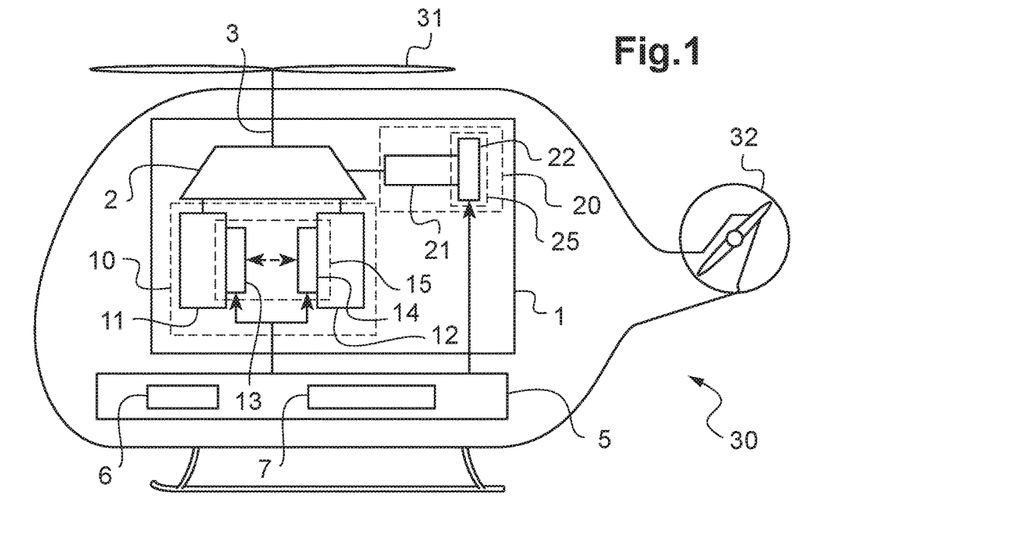
FIG. 1 shows a rotary wing aircraft fitted with a device of the invention for regulating a power plant.

FIG. 1 shows a rotary wing aircraft 30 having a main rotor 31, a tail rotor 32, a power plant 1, and an avionics installation 5. The power plant 1 has a first engine group 10, a second engine group 20, and a main power transmission gearbox 2. The two engine groups 10 and 20 drive the main gearbox 2 mechanically in order to drive rotation of a main outlet shaft 3 of the main gearbox 2. The main outlet shaft 3 is constrained to rotate with the main rotor 31, which rotates at a frequency of rotation NR in order to provide the aircraft 30 with lift and possibly also propulsion.

The tail rotor 32 may also be driven in rotation by the main gearbox 2 via a secondary outlet shaft from the main gearbox 2.

The first engine group 10 comprises two identical main engines 11 and 12 and a first regulator device 15. The first regulator device 15 has two main computers 13 and 14, each main computer 13, 14 being connected to a single main engine 11, 12. The main computers 13 and 14 are also connected to each other. Each main engine 11, 12 delivers a main maximum power $W_{Max1}$.

The second engine group 20 comprises a secondary engine 21 and a second regulator device 25. The second regulator device 25 comprises a secondary computer 22 connected to the secondary engine 21. The secondary engine 21 is different from the main engines 11 and 12. The secondary engine 21 is lighter in weight and of smaller dimensions than the main engines 11 and 12, and it delivers a secondary maximum power $W_{Max2}$ that is less than each of the main maximum powers $W_{Max1}$ from the main engines 11, 12.

The main engines 11 and 12 and the secondary engine 21 are turboshaft engines, each comprising a gas generator and a free turbine driving the main gearbox 2.

The main engines 11 and 12 and the secondary engine 21 can deliver main and secondary maximum powers $W_{Max1}$ and $W_{Max2}$ that differ depending on the stage of flight and the operating conditions of the engines, in particular a maximum continuous power MCP, a maximum takeoff power TOP, and OEI contingency mechanical powers.

The avionics installation 5 has calculation means 6 and anticipation means 7.

Figure 2:
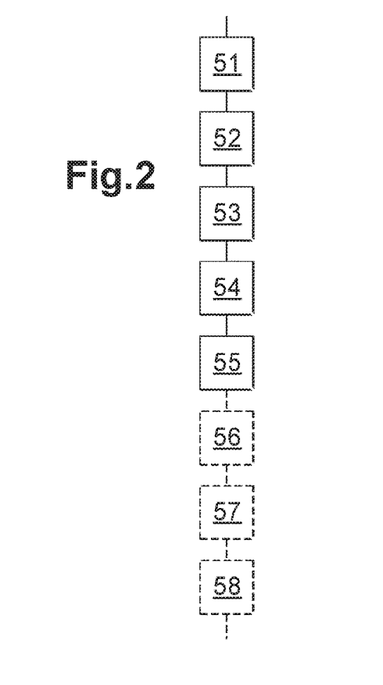
FIG. 2 is a block diagram summarizing the method of the invention for regulating a power plant.

FIG. 2 is a block diagram summarizing the method of the invention for regulating a power plant. This method of regulating a power plant comprises five main steps.

During a first step 51, a first setpoint NR* is determined for the frequency of rotation NR of the main rotor 31. This first setpoint NR* may be a fixed value as determined during development of the aircraft 30, or it may be a variable value that is then determined continuously while the aircraft 30 is in flight by the calculation means 6.

During a second step 52, the operation of each main engine 11, 12 is regulated on the first setpoint NR* for the frequency of rotation NR of the main rotor 31 by means of the first regulator device 15.

Thus, by means of the first regulator device 15, the first engine group 10 serves to control the frequency of rotation NR of the main rotor 31, this frequency of rotation NR being substantially equal to the first setpoint NR*.

The first regulator device 15 serves, by way of example, to regulate both main engines 11, 12 using a proportional integral regulation loop. Since these two main engines 11, 12 are identical, their operation is then symmetrical, each main engine 11, 12 contributing an equal share to driving the main rotor 31 via the main outlet shaft 3.

During a third step 53, a flight power $W_{vol}$ necessary for the flight of the aircraft 30 is determined. This flight power $W_{vol}$ is delivered by the power plant 1 and is shared between the main rotor 31, the tail rotor 32, and equipment on board the aircraft 30.

This flight power $W_{vol}$ is thus equal to the sum of an accessory power powering that equipment plus a power needed to enable the aircraft 30 to fly as determined using performance plots for the aircraft 30. These performance plots are specific for each stage of flight of the aircraft 30.

Figure 3:
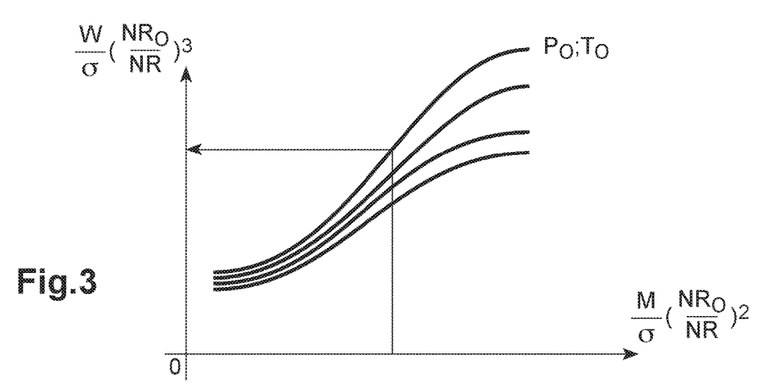
FIGS. 3 to 5 are performance plots of the aircraft.
Figure 4:
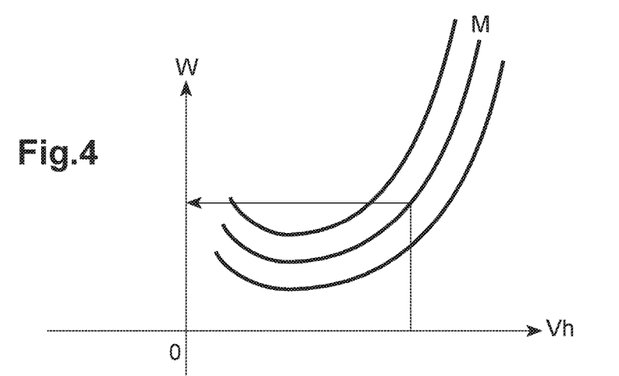
Figure 5:
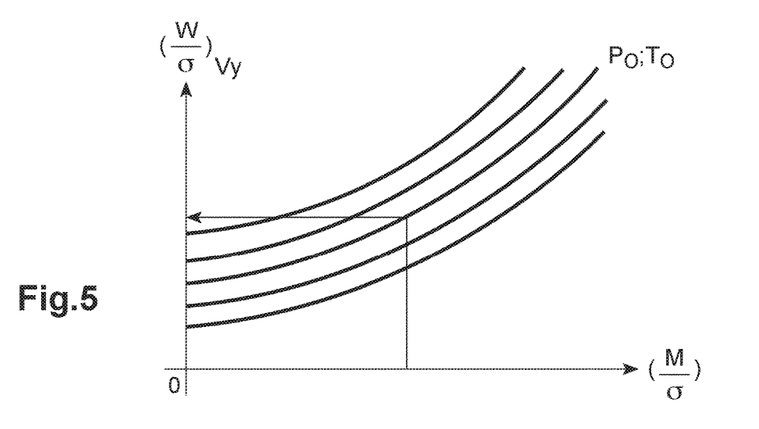

Examples of such performance plots are shown in FIGS. 3 to 5.

FIG. 3 shows a first performance plot for hovering flight of the aircraft 30. This first performance plot for hovering flight is constituted by curves as a function of atmospheric conditions, in particular the pressure $P_0$ and the temperature $T_0$ of the air outside the aircraft 30.

FIG. 4 shows a second performance plot for level flight of the aircraft 30. This second performance plot for level flight is constituted by curves as a function of the total mass M of the aircraft 30.

FIG. 5 shows a third performance plot for climbing flight of the aircraft 30. This third performance plot for climbing flight is constituted by curves as a function of atmospheric conditions, in particular the pressure $P_0$ and the temperature $T_0$ of the air outside the aircraft 30.

Other performance plots that are not shown exist for other stages of flight, and in particular for stages of the aircraft 30 taking off and landing.

Driving a fourth step 54, a second setpoint $W_2^*$ is determined for the power to be delivered by the second engine group 20.

This second setpoint $W_2^*$ is determined by the calculation means 60 depending on the flight power $W_{vol}$ of the aircraft 30 and the main maximum powers $W_{Max1}$ from each of the main engines 11, 12 of the first engine group 10 so that the secondary engine 21 operates only when the first engine group 10 cannot, on its own, deliver the flight power $W_{vol}$ needed for the flight of the aircraft 30.

Thus, so long as a first sum of main maximum powers $W_{Max1}$ from each engine 11, 12 is greater than or equal to the flight power $W_{vol}$, the second setpoint $W_2^*$ is zero. As a result, the first engine group 10 acts on its own and without assistance from the second engine group 20 to deliver this flight power $W_{vol}$ needed for the flight of the aircraft 30. This first situation corresponds to stages of flight of the aircraft 30 that consume little power.

In addition, in a second situation, when the difference between the flight power $W_{vol}$ and the first sum of main maximum powers $W_{Max1}$ from each of the main engines 11 and 12 is positive and less than a second sum of secondary maximum powers $W_{Max2}$ from the secondary engine 21, the second setpoint $W_2^*$ is equal to this difference between the flight power $W_{vol}$ and the first sum of main maximum powers $W_{Max1}$.

In contrast, in a third situation, when this difference between the flight power $W_{vol}$ and the first sum of main maximum powers $W_{Max1}$ is greater than the second sum of secondary maximum powers $W_{Max2}$, the second setpoint $W_2^*$ is equal to this second sum of secondary maximum powers $W_{Max2}$.

The secondary engine 21 is then loaded, or indeed heavily loaded, to deliver additional power needed to perform the stage of flight of the aircraft 30. This corresponds to stages of flight of the aircraft 30 that consume large amounts of power.

During a fifth step 55, the operation of the secondary engine 21 is regulated on the second setpoint $W_2^*$ for power by the second regulator device 25. The second engine group 21 thus delivers second power $W_2$ that is substantially equal to the second setpoint $W_2^*$.

The operation of the secondary engine 21 is thus optimized as a function of power requirements from the main engines 11, 12. The method of regulating a power plant advantageously makes it possible continuously and as a function of the power requirement of the aircraft 30 and of the loads on the main engines 11 and 12 to manage the distribution of powers between the main engines 11 and 12 and the secondary engine 21 of the power plant 10.

The method of regulating a power plant may also include three additional steps.

During a sixth step 56, a flight anticipation power Ws* is determined by the anticipation means 7. This flight anticipation power Ws* corresponds to power that might potentially be necessary for the flight of the aircraft 30 and that needs to be delivered jointly by the main engines 11 and 12 and the secondary engine 21.

During a seventh step 57, the calculation means 6 determine a third setpoint $W_1^*$ for the power that the first engine group 10 is to deliver, such that:

$$Ws^* = W_1^* + W_2^*$$

During an eighth step 58, the third setpoint $W_1^*$ for power is used so that the first engine group 10 and the second engine group 20 anticipate a power need of the aircraft 30 and jointly deliver the flight anticipation power Ws*.

The first engine group 10 and the second engine group 20 then jointly deliver an output power Ws that is equal to the sum of the second output power $W_2$ delivered by the second engine group 20 plus a first power $W_1$ delivered by the first engine group 10, such that:

$$Ws = W_1 + W_2$$

The first power $W_1$ is then substantially equal to the third setpoint $W_1^*$ and the output power Ws is substantially equal to the flight anticipation power Ws*.

Furthermore, in the event of failure of a main engine 11, 12, it is possible to continue regulating the operation of the secondary engine 21 on the second setpoint $W_2^*$ for power.

Thus, the secondary engine 21 operates only when the flight power $W_{vol}$ is greater than the main maximum power $W_{Max1}$ delivered by the still-working main engine 11, 12.

Nevertheless, in the event of a failure of a main engine 11, 12, the regulation of the secondary engine 21 may also be different so as to have a different distribution of power delivery by the power plant 1 between the main engine 11, 12 that has not failed and the secondary engine 21.

For example, it is possible to use the secondary engine 21 delivering its secondary maximum power $W_{Max2}$. The second engine group 20 then delivers a second maximum power $W_2$ in order to limit the first power $W_1$ delivered by the first engine group 10. It is thus possible to reduce or even avoid use of the OEI contingency modes of each of the main engines 11 and 12 and the associated contingency mechanical powers.

It is also possible to regulate the operation of the secondary engine 21 on the first setpoint NR* for the frequency of rotation NR of the main rotor 31, in order to guarantee that this first setpoint NR* is complied with. This regulation may be performed in proportional mode or in proportional integral mode.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of regulating a power plant of a rotary wing aircraft, the power plant comprising a first engine group, a second engine group, and a main power transmission gearbox, the first engine group and the second engine group mechanically driving the main gearbox in order to rotate a main outlet shaft of the main gearbox, the main outlet shaft being constrained to rotate with a main rotor of the aircraft having a frequency of rotation NR, the first engine group having at least two main engines, the second engine group having at least one secondary engine, each main engine being capable of delivering a main maximum power $W_{Max1}$, each secondary engine being capable of delivering a secondary maximum power $W_{Max2}$, the method comprising the following steps:
    determining a first setpoint NR* for the frequency of rotation NR of the main rotor;
    regulating operation of each main engine on the first setpoint NR* for the frequency of rotation NR;
    determining a flight power $W_{vol}$ needed for the flight of the aircraft, the flight power $W_{vol}$ being delivered by the power plant;
    determining a second setpoint $W_2$* for power to be delivered by the second engine group so that each secondary engine operates only when the flight power $W_{vol}$ is greater than the sum of the main maximum powers $W_{Max1}$ of each main engine; and
    regulating operation of each secondary engine on the second setpoint $W_2$ for power.

2. A method of regulating a power plant according to claim 1, comprising the following steps:
    determining a flight anticipation power Ws* needed for the flight of the aircraft and to be delivered jointly by the first engine group and the second engine group; and
    determining a third setpoint $W_1$* for power to be delivered by the first engine group, such that:

$$Ws^* = W_1^* + W_2^*$$

using the third setpoint $W_1$* for power so that the first engine group and the second engine group anticipate a power need of the aircraft and deliver jointly the flight anticipation power Ws*.

3. A method of regulating a power plant according to claim 1, wherein the second setpoint $W_2$* is equal to:
    the value zero when a first sum of the main maximum powers $W_{Max1}$ from each main engine is greater than or equal to the flight power $W_{vol}$;
    the difference between the flight power $W_{vol}$ and the first sum of the main maximum powers $W_{Max1}$ when the difference is positive and less than a second sum of the main secondary maximum power $W_{Max2}$ from each secondary engine; and
    the second sum of the secondary maximum powers $W_{Max2}$ when the difference is greater than the second sum of the secondary maximum powers $W_{Max2}$.

4. A method of regulating a power plant according to claim 1, wherein the flight power $W_{vol}$ needed for the flight of the aircraft is determined depending on the stage of flight of the aircraft.

5. A method of regulating a power plant according to claim 1, wherein the flight power $W_{vol}$ necessary for the flight of the aircraft is determined from performance plots of the aircraft.

6. A method of regulating a power plant according to claim 1, wherein in the event of a failure of at least one main engine, the operation of each secondary engine is regulated on the first setpoint NR* for the frequency of rotation NR of the main rotor.

7. A method of regulating a power plant according to claim 1, wherein in the event of a failure of at least one main engine, the operation of each secondary engine is regulated on the second setpoint $W_2$* for power.

8. A method of regulating a power plant according to claim 1, wherein in the event of a failure of at least one main engine, the operation of each secondary engine is regulated so that it delivers the secondary maximum power $W_{Max2}$.

9. A method of regulating a power plant according to claim 1, wherein the first engine group comprises two identical main engines, and the second engine group comprises one secondary engine.

10. A power plant for an aircraft, the power plant comprising a first engine group, a second engine group, and a main power transmission gearbox, the first engine group and the second engine group mechanically driving the main gearbox in order to rotate at least one main outlet shaft of the main gearbox, the main outlet shaft being constrained to rotate with a main rotor of the aircraft having a frequency of rotation NR, the first engine group having at least two main engines, and a first regulator device, the first regulator device being configured to regulate operation of each main engine on a first setpoint NR* for the frequency of rotation NR of the main rotor, the second engine group comprising at least one secondary engine and a second regulator device, the second regulator device being configured to regulate operation of each secondary engine on a second setpoint $W_2$* for power from the second engine group, the power plant being required to deliver a flight power $W_{vol}$ necessary for the flight of the aircraft, each main engine being capable of delivering a main maximum power $W_{Max1}$, each secondary engine being capable of delivering a secondary maximum power $W_{Max2}$, wherein the power plant includes calculation means configured to determine the second setpoint $W_2$* so that each secondary engine operates only when the flight power $W_{vol}$ is greater than the sum of the main maximum powers $W_{Max1}$ from each main engine.

11. A power plant according to claim 10, wherein the calculation means comprise anticipation means configured to determine a flight anticipation power Ws* necessary for the flight of the aircraft and that needs to be delivered jointly by the first engine group and second engine group, a third setpoint $W_1$* to be delivered by the first engine group and defined such that:

$$Ws^* = W_1^* + W_2^*$$

being used so that the first engine group and the second engine group anticipate a power need of the aircraft and deliver jointly the flight anticipation power Ws*.

12. A power plant according to claim 10, wherein the second setpoint $W_2$* is equal to:
the value zero when a first sum of the main maximum powers $W_{Max1}$ from each main engine is greater than or equal to the flight power $W_{vol}$;
the difference between the flight power $W_{vol}$ and the first sum of the main maximum powers $W_{Max1}$ from each main engine when the difference is positive and less than a second sum of the main secondary maximum power $W_{Max2}$; and
the second sum of the secondary maximum powers $W_{Max2}$ when the difference is greater than the second sum of the secondary maximum powers $W_{Max2}$.

13. A power plant according to claim 10, wherein the flight power $W_{vol}$ necessary for the flight of the aircraft is defined depending on the stage of flight of the aircraft on the basis of performance plots of the aircraft.

14. A power plant according to claim 10, wherein the first engine group comprises two identical main engines and the second engine group comprises one secondary engine.

15. A rotary wing aircraft having at least a main rotor, a power plant, and an avionics installation, the power plant driving the main rotor in rotation, and the aircraft being wherein the power plant is a power plant according to claim 10.

* * * * *